United States Patent [19]
Bekku et al.

[11] Patent Number: 5,727,317
[45] Date of Patent: Mar. 17, 1998

[54] METHOD OF FORMING AN OUTER RING OF AN AXLE BEARING

[75] Inventors: Itsuro Bekku, Okayama; Eiji Tajima, Shizuoka, both of Japan

[73] Assignee: NTN Corporation, Osaka, Japan

[21] Appl. No.: 618,607

[22] Filed: Mar. 20, 1996

[30] Foreign Application Priority Data

Mar. 28, 1995 [JP] Japan .................................. 7-069421

[51] Int. Cl.$^6$ .................................................. B23P 15/00
[52] U.S. Cl. .......................... 29/898.06; 29/898.13; 29/423; 384/625; 148/906; 148/571
[58] Field of Search ............... 29/898.06, 898.066, 29/898.09, 898.13, 423; 384/448, 625; 148/526, 571, 906

[56] References Cited

U.S. PATENT DOCUMENTS

| | | | |
|---|---|---|---|
| 1,326,224 | 12/1919 | Timler | 29/898.066 |
| 2,370,173 | 2/1945 | Kendall | 29/898.066 |
| 2,384,444 | 1/1945 | Cravener, Jr. et al. | 29/898.066 |
| 2,613,429 | 10/1952 | Dierbeck | 29/898.066 |
| 2,983,030 | 5/1961 | Bricacci | 29/898.066 |
| 3,004,322 | 10/1961 | Pitner | 29/898.066 |
| 3,714,694 | 2/1973 | Dobson | 29/898.066 |
| 3,795,960 | 3/1974 | Elmore et al. | 29/898.066 |
| 4,960,333 | 10/1990 | Faye et al. | 384/448 |
| 4,969,753 | 11/1990 | Kato et al. | 384/448 |
| 5,121,998 | 6/1992 | Bhatia | 384/448 |
| 5,129,743 | 7/1992 | Faye et al. | 384/448 |
| 5,192,138 | 3/1993 | Faye et al. | 384/448 |
| 5,429,394 | 7/1995 | Olson | 29/423 |
| 5,446,957 | 9/1995 | Wu | 29/423 |

*Primary Examiner*—Larry I. Schwartz
*Assistant Examiner*—Marc W. Butler
*Attorney, Agent, or Firm*—Wenderoth, Lind & Ponack

[57] ABSTRACT

An outer ring of an axle bearing is heat-treated and a through hole can be formed quickly and reliably. The outer ring has raceways on its inner periphery along which rolling elements roll. A through hole for mounting an antilock brake sensor is formed in the outer ring to extend from its outer periphery to the inner periphery. A plug is inserted into the hole thus formed. After hardening the raceways, the plug is pulled out of the hole. Since the hole is formed before hardening the raceways, it can be formed easily by drilling with an ordinary carbon steel tool. Since the raceways are hardened after inserting the rod-shaped metal plug into the hole 9, the heat produced during hardening will disperse through the plug. It is thus possible to prevent shoulder portions of the raceways from melting due to overheating.

8 Claims, 4 Drawing Sheets

FIG. 5
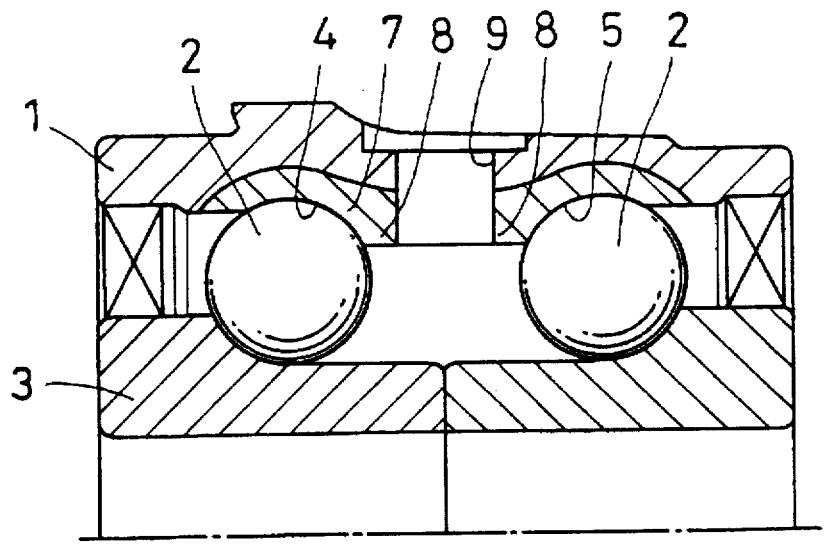
PRIOR ART    FIG. 6
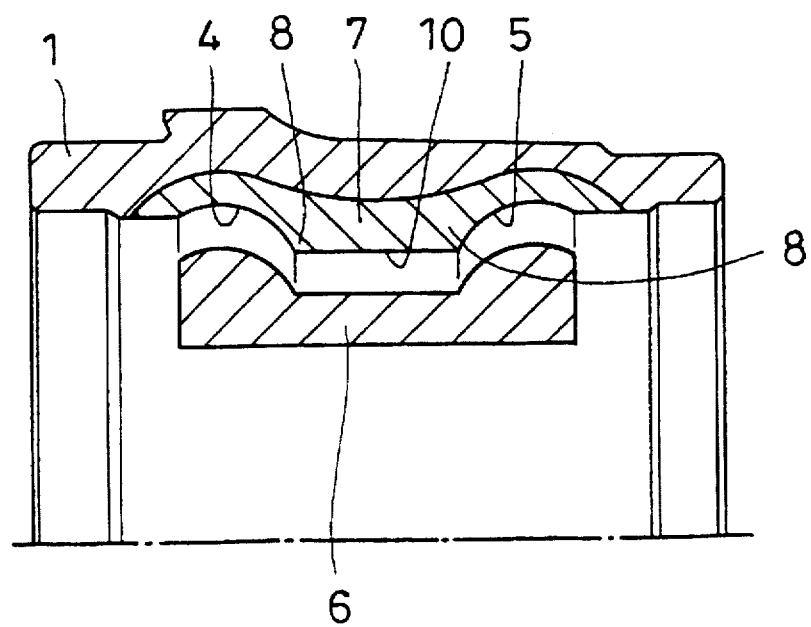

METHOD OF FORMING AN OUTER RING OF AN AXLE BEARING

BACKGROUND OF THE INVENTION

This invention relates to a method of forming an outer ring of an axle bearing to which an antilock brake sensor is mounted.

As shown in FIG. 5, an axle bearing has an outer ring 1. A plurality of rolling elements 2 are arranged inside the outer ring 1 in two rows to rotatably support an inner ring 3. Two raceways 4 and 5 are formed on an inner periphery of the outer ring 1. The two rows of rolling elements 2 roll in the respective two raceways 4 and 5. To improve the durability of the outer ring against the contact pressure with the rolling elements 2, a hardened layer 7 is formed by hardening to cover the surfaces of the raceways 4 and 5 by moving a coil 6 close to the inner periphery of the outer ring 1 as shown in FIG. 6 and passing a high-frequency current through the coil 6. When forming the layer 7 by hardening, the raceways tend to an heat up to especially high temperature at their shoulder portions 8. Thus, the hardened layer 7 formed tends to be thicker at the shoulder portions 8 than the remaining portion.

In order to mount an antilock brake sensor on the outer ring 1 of such an axle bearing, it is necessary to form a hole 9 in the outer ring 1 that extends from its outer periphery to the inner periphery at the area between the raceways 4 and 5. This hole 9 is formed as shown in FIG. 7 after hardening the raceways 4 and 5.

A problem with this prior arrangement is that because the hardened layer 7 also covers the inner surface 10 of the outer ring 1 between the raceways 4 and 5, it is necessary to use an especially hard special tool to form the hole 9 by breaking the hardened layer 7. Otherwise, it has to be formed by electric discharge machining. In either case, it is very costly and takes a long time to form the hole 9.

If the hardened layer is formed after forming the hole 9, the shoulder portions 8 may melt as shown in FIG. 8 if the distance between the raceways 4 and 5 is short.

SUMMARY OF THE INVENTION

An object of this invention is to provide a method of forming an outer ring of an axle bearing in which the outer ring can be heat-treated and a hole can be formed quickly and reliably.

According to this invention, there is provided a method of working an outer ring of an axle bearing, the outer ring having an outer peripheral surface and an inner peripheral surface formed with raceways along which a plurality of rolling elements roll. The method comprising the steps of forming a through hole in the outer ring to mount a sensor therein, the through hole extending from the outer peripheral surface to the inner peripheral surface, inserting a rod-shaped metal plug into the through hole, hardening the raceways, and then pulling the plug out of the through hole.

The raceways are preferably hardened by induction hardening.

The plug is preferably of a non-magnetizable metal.

Since the through hole is formed before hardening, it can be formed easily by drilling with an ordinary carbon steel tool.

Since the raceways are hardened after inserting the rod-shaped metal plug into the hole, the heat produced during hardening will disperse through the plug. It is thus possible to prevent shoulder portions of the raceways from melting due to overheating.

By hardening the raceways by induction hardening, the current flowing through the plug suppresses the production of Joule heat. Thus, it is possible to restrain the temperature rise at the shoulders of the raceways even more effectively.

By using a plug made of a non-magnetizable material such as brass, gun metal or stainless steel, most of the magnetic flux produced is blocked, so that the production of Joule heat is suppressed still further.

BRIEF DESCRIPTION OF THE DRAWINGS

Other features and objects of the present invention will become apparent from the following description made with reference to the accompanying drawings, in which:

FIG. 5 is a sectional view of an entire axle bearing;

FIG. 6 is a view showing the induction hardening step in a conventional method;

DETAILED DESCRIPTION OF THE PREFERRED EMBODIMENT

The embodiment is now described with reference to the drawings.

The same elements that appear in the prior art of FIG. 5 are designated by the same numerals and their description is omitted.

Figure 1:
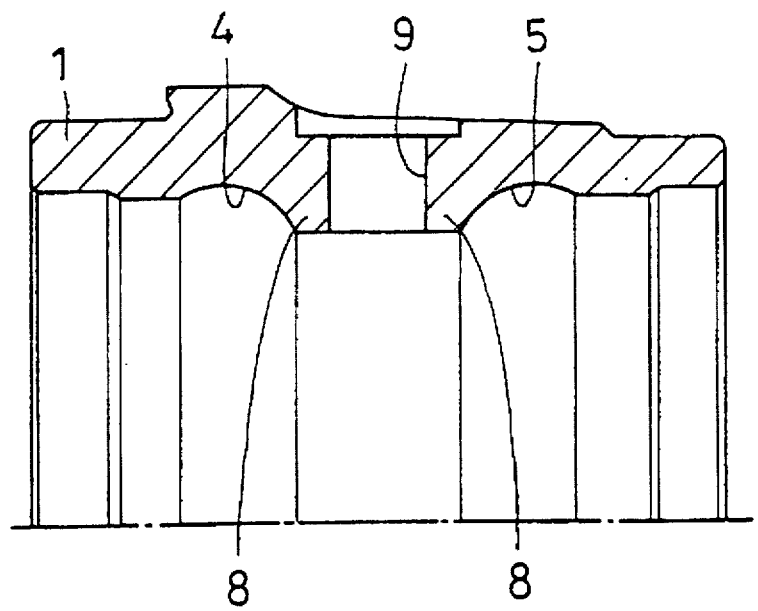
FIG. 1 is a view showing a step of forming a through hole in a method embodying the present invention.

Referring first to FIG. 1, a through hole 9 for mounting an antilock brake sensor is formed in the outer ring 1. It extends from the outer periphery to the inner periphery of the outer ring so that its inner end is between raceways 4 and 5. The inner periphery of the outer ring 1 is not yet hardened when forming the hole 9, so that the hole 9 can be easily formed by drilling with an ordinary tool e.g. of carbon steel. The hole 9 may be provided to extend radially or may be inclined relative to the radial direction. The hole 9 may be formed so that its inner end (formed on the inner periphery of the outer ring) is located near either end of the outer ring 1 at the raceway 4 or 5.

Figure 2:
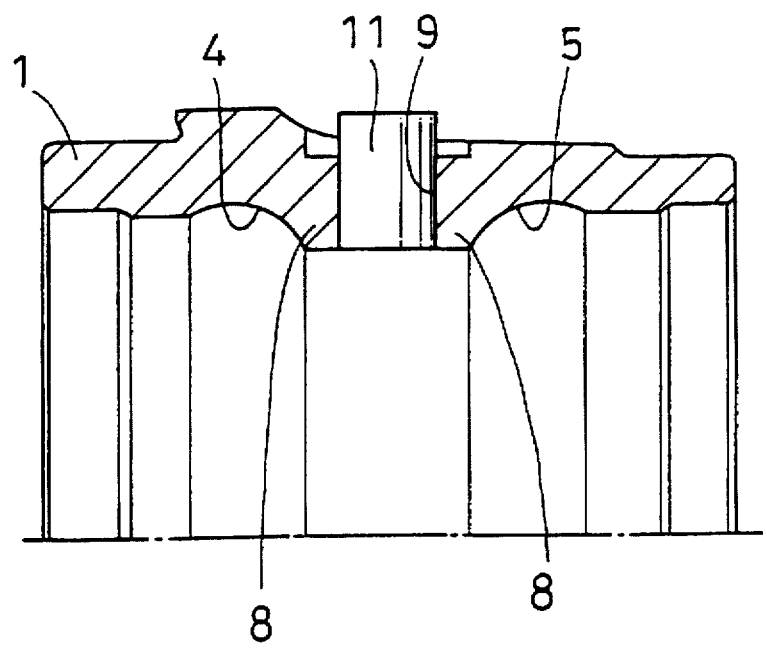
FIG. 2 is a view showing a step of inserting a plug into the through hole.

Then, as shown in FIG. 2, a rod-shaped metal plug 11 is inserted into the hole. The plug 11 has a diameter substantially equal to the diameter of the hole 9 so that the outer surface of the plug 11 comes into close contact with the inner wall of the hole 9.

Figure 3:
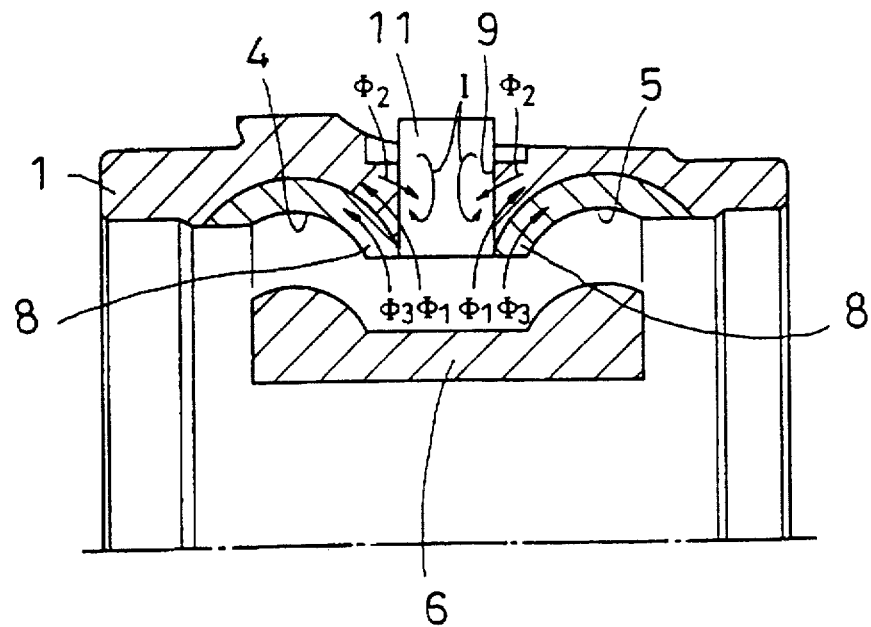
FIG. 3 is a view showing an induction hardening step.

With the plug 11 inserted in the hole 9, a coil 6 is moved close to the inner periphery of the outer ring 1, as shown in FIG. 3, and a high-frequency current is passed through the coil 6 to form a hardened layer 7 that covers the raceways 4 and 5.

If the magnetic flux $\Phi 1$ produced by the coil 6 increases in the direction of the arrows, a current I will flow through the plug 11, thus producing a magnetic flux $\Phi 2$ that acts to cancel out the magnetic flux $\Phi 1$. This makes it difficult for the magnetic flux $\Phi 1$ at the end face of the plug 11 to flow through the plug 11. Rather, the magnetic flux $\Phi 1$ flows in the direction of Φ3. Thus, the inner wall of the hole 9, in which is inserted the plug 11, is not heated, so that the shoulder portions 8 of the raceways 4 and 5 are heated less. It is thus possible to prevent the shoulder portions 8 from melting.

As described above, the plug 11 is used to suppress overheating due to the Joule effect by blocking magnetic flux. Thus, the plug 11 is preferably made of a non-magnetizable material such as brass, gun metal or stainless steel. But even a plug made of a magnetizable material such as iron can prevent excessive heating of the shoulder portions 8 because heat disperses due to thermal conduction. Since a current I flows through the plug 11, it has to be formed from a material with low resistivity to prevent heat build-up.

Figure 4:
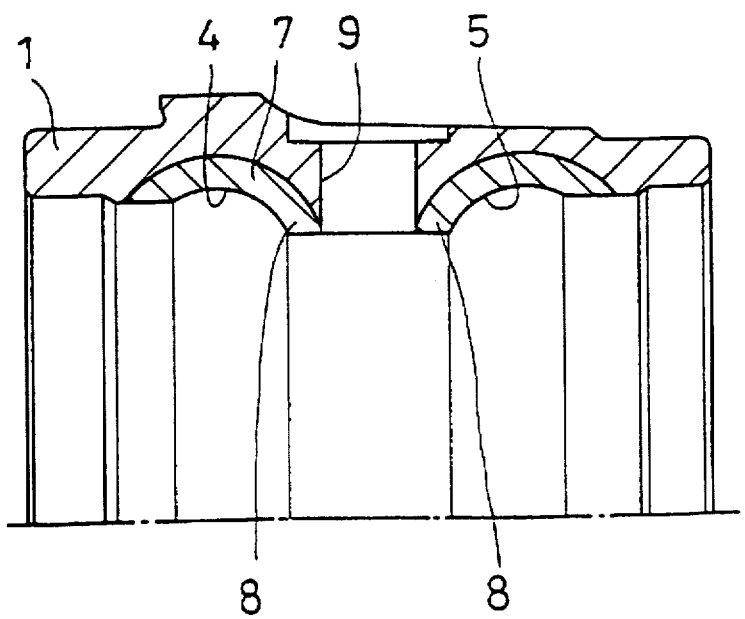
FIG. 4 is a view showing the state after pulling the plug out of the through hole.

After forming the hardened layer 7, the plug 11 is pulled out of the hole 9 as shown in FIG. 4.

Figure 7:
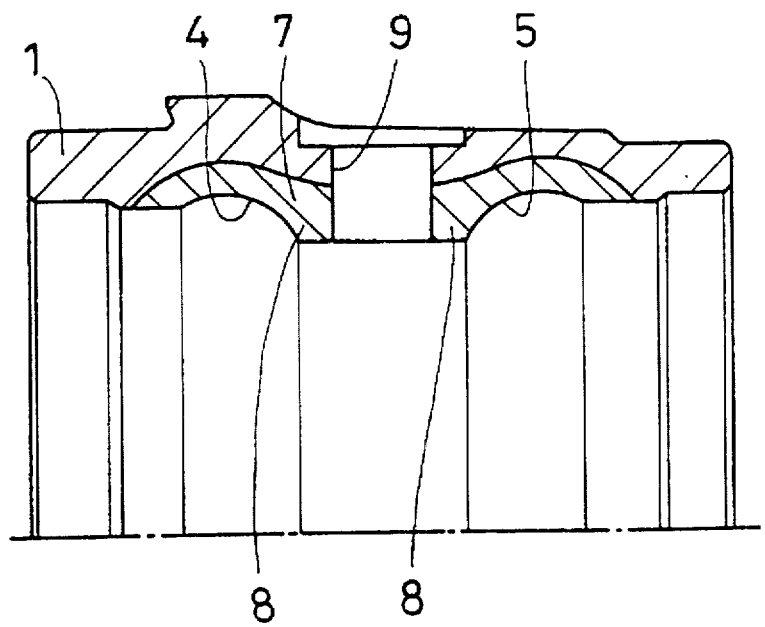
FIG. 7 is a view showing the step of forming a through hole in the conventional method.
Figure 8:
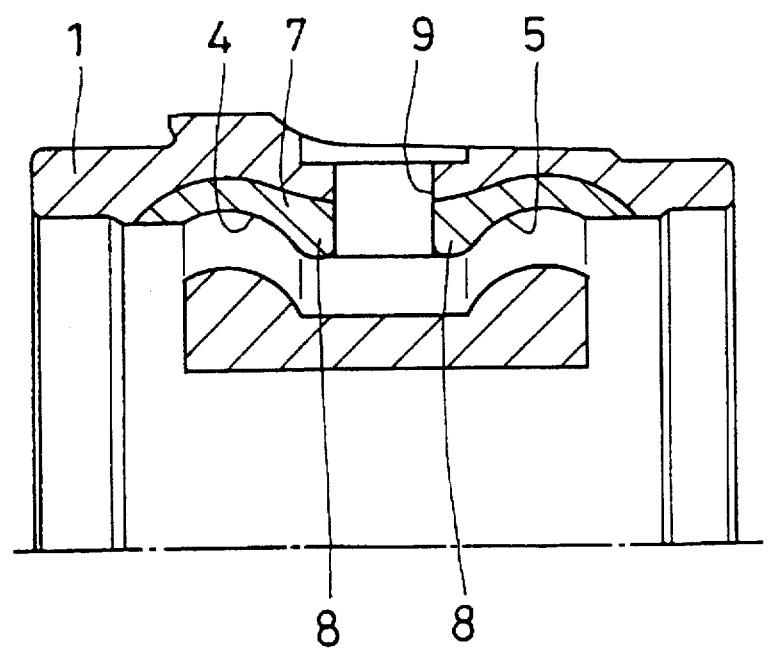
FIG. 8 is a view showing shoulder portions of the raceways that have been melted by being overheated during the induction hardening step in the conventional method.

The heat pattern of the hardened layer 7 at its portions covering the raceways 4 and 5 is substantially the same as when no hole 9 is formed. Near the opening of the hole 9, the hardened layer 7 is thinner than the hardened layer formed by the conventional method shown in FIG. 7.

Even if the hardened layer is formed by a hardening method other than induction hardening, the plug 11 serves to disperse heat sufficiently, thus preventing overheating of the shoulder portions 8.

A sensor is inserted in the thus formed hole 9 of the outer ring 1 and fixed. The inner ring 3 is inserted in the outer ring 1 so that the pulser ring mounted around the inner ring will face the sensor. The axle bearing thus assembled is used as a component of an antilock brake system.

Since the hardened layer is sufficiently thin near the inner end of the through hole, it is possible to provide the raceways sufficiently close to each other. It is thus possible to manufacture a sufficiently compact outer ring and thus a sufficiently compact bearing.

The plug can be used repeatedly, which is desirable from an economical viewpoint.

What is claimed is:

1. A method of treating an outer ring of an axle bearing comprising the steps of:

forming a through hole for mounting a sensor extending from an outer peripheral surface of the outer ring to an inner peripheral surface of the outer ring of the axle bearing between two raceways on the inner peripheral surface of the outer ring;

inserting a rod-shaped metal plug into the through hole so that heat can be dispersed during hardening;

hardening the raceways and the inner peripheral surface between the raceways by induction hardening only after inserting said rod-shaped metal plug; and pulling the plug out of the through hole.

2. The method of claim 1, wherein the plug is made of a non-magnetizable metal.

3. The method of claim 2, wherein the non-magnetizable metal is selected from the group consisting of brass, gun metal and stainless steel.

4. The method of claim 1, wherein said step of forming comprises drilling the through hole.

5. The method of claim 4, wherein said step of forming comprises drilling with a carbon steel tool.

6. The method of claim 1, wherein said step of forming comprises forming the through hole so as to extend radially of said outer ring.

7. The method of claim 1, and further comprising the step of mounting a sensor in the outer ring by inserting a sensor in the through hole after said step of pulling, and fixing the sensor.

8. A method of treating an outer ring of an axle bearing comprising the steps of:

forming a through hole for mounting a sensor extending from an outer peripheral surface to an inner peripheral surface of an outer ring of an axle bearing between two raceways on the inner peripheral surface of the outer ring;

inserting a metal plug having a size and shape corresponding to the size and shape of the through hole at the inner peripheral surface of the outer ring into the through hole so that heat can be dispersed during a subsequent hardening operation;

hardening the raceways and the inner peripheral surface between the raceways by induction hardening after inserting the plug into the through hole; and pulling the plug out of the through hole.

\* \* \* \* \*